US 8,369,342 B2

(12) United States Patent
Chiang (10) Patent No.: US 8,369,342 B2
(45) Date of Patent: Feb. 5, 2013

(54) SYSTEM, APPARATUS, AND METHOD FOR EXTENDING NETWORK WITH POWER SUPPLY (75) Inventor: Chien Hao Chiang, Zhonghe (TW)

(73) Assignee: Etherwan Systems, Inc., Taipei County (TW)

( * ) Notice: Subject to any disclaimer, the term of this patent is extended or adjusted under 35 U.S.C. 154(b) by 447 days.

(21) Appl. No.: 12/756,425

(22) Filed: Apr. 8, 2010

(65) Prior Publication Data

US 2011/0051737 A1  Mar. 3, 2011

(51) Int. Cl.
*H04L 12/28* (2006.01)
*H04L 12/56* (2006.01)

(52) U.S. Cl. .......... 370/395.5; 370/401
(58) Field of Classification Search .......... None
See application file for complete search history.

(56) References Cited

U.S. PATENT DOCUMENTS

| | | | |
|---|---|---|---|
| 6,587,476 B1 * | 7/2003 | Lewin et al. | 370/467 |
| 6,608,834 B1 * | 8/2003 | Lewin et al. | 370/395.53 |
| 8,036,231 B2 * | 10/2011 | Pratt | 370/401 |
| 8,125,998 B2 * | 2/2012 | Anto Emmanuel | 370/401 |
| 2002/0126803 A1 * | 9/2002 | Jones et al. | 379/22.02 |
| 2002/0196740 A1 * | 12/2002 | Lee et al. | 370/250 |
| 2003/0076878 A1 * | 4/2003 | Jones et al. | 375/219 |
| 2006/0098725 A1 * | 5/2006 | Rhee et al. | 375/222 |
| 2006/0209872 A1 * | 9/2006 | Matsui | 370/437 |
| 2006/0268733 A1 * | 11/2006 | Rhee et al. | 370/252 |
| 2007/0019560 A1 * | 1/2007 | Brewer et al. | 370/252 |
| 2009/0003296 A1 * | 1/2009 | Zheng | 370/338 |
| 2009/0129272 A1 * | 5/2009 | Padfield et al. | 370/235 |
| 2010/0103943 A1 * | 4/2010 | Walter | 370/401 |
| 2010/0183087 A1 * | 7/2010 | Hosokawa et al. | 375/262 |
| 2010/0246598 A1 * | 9/2010 | Bremer et al. | 370/464 |

* cited by examiner

Primary Examiner — Phirin Sam
Assistant Examiner — Peter Chau
(74) Attorney, Agent, or Firm — McClure, Qualey & Rodack, LLP (57) ABSTRACT

System, apparatus, and method for extending network with power supply are disclosed. The apparatus includes a processing unit, a signal and power integration unit, a power supply unit, a transmission rate regulation unit, a display unit, and a symmetric transmission control unit. The signal and power integration unit integrates the electrical power with the data packages, so that the normal data transmission line can also transmit electrical power alone with signals to the electrical devices which are connected to the network extending apparatus. Therefore, the electrical devices do not need any extra power transmission line or independent power supply for obtaining the requisite power.

18 Claims, 5 Drawing Sheets

SYSTEM, APPARATUS, AND METHOD FOR EXTENDING NETWORK WITH POWER SUPPLY

BACKGROUND OF THE INVENTION

1. Field of the Invention

The present invention relates to a system for extending network, especially to system, apparatus, and method for extending network with power supply.

2. Description of the Related Art

The Ethernet network connection has a restriction in communication distance. For example, the restriction in Ethernet connection is about 100 meters by copper wires. When the network connection is used at home or offices, 100 meters is quite enough, but not in the outdoor using cases. That is, for safety concern, there may have some monitor devices installed at public places. The control center may be far away from the monitor devices, so the distance of network connection between the control center and the monitor device may exceed 100 meters. Therefore, setting up long-distanced network connection cannot use usual manners, which makes installation of the long-distanced network connection a complicated task.

Additionally, when setting up outdoor network connections, the requisite electrical power is not easily obtained as in indoor connection cases. Generally, the requisite electrical power for driving outdoor devices is obtained from an extra-connected power supply line, or from an independent power source which is just for some particular purposes. But no matter which way the requisite electrical power is obtained, the cost and complicity of installing and maintaining the outdoor devices is increased.

SUMMARY OF THE INVENTION

In light of the aforementioned problems, the present invention discloses a network extending system with power supply, and the apparatus and method thereof. The system extends network distance by converting communication protocols. And additionally, the network connection line can transmit electrical power along with signals, thus the outdoor electrical devices do not need to install an extra power transmission line or an independent power supply.

For achieving the above purposes, the network extending apparatus is provided. The apparatus includes a processing unit, at least one signal and power integration unit, a power supply unit, and at least one signal and power connection interface. In which, the processing unit is for converting the data format of transmitted signal packages between a first communication protocol and a second communication protocol. The second communication protocol is a symmetric communication protocol, that is, the upload transmission rate and the download transmission rate are similar. For example, VDSL (very-high bit-rate digital subscriber line), VDSL2 (very-high bit-rate digital subscriber line 2), and G.SHDSL (single-pair high speed digital subscriber line) are symmetric communication protocols.

The signal and power integration unit couples with the processing unit, for integrating signals and electrical power. The signal and power integration unit can be a PoE unit which uses the techniques of Power over Ethernet, in order to make Ethernet networks be able to transmit electrical power. The power supply unit couples with the signal and power integration unit, for providing electrical power to the signal and power integration unit. The signal and power connection interface couples with the signal and power integration unit, for connecting an electrical device and transmitting signals and electrical power.

Additionally, the network extending apparatus can further include a transmission rate regulation unit and a symmetric transmission control unit. In which the transmission rate regulation unit couples with the processing unit, for setting a data transmission rate. And, the symmetric transmission control unit couples with the processing unit, for keeping the two direction transmission rate symmetric according to the second communication protocol.

The present invention further provides a network extending system. The system couples between a host and an electrical device, for extending the network connection distance. The system has a first network extending apparatus and a second network extending apparatus. In which the first network extending apparatus connects to the host through a host connection interface, and has a first processing unit, a first transmission rate regulation unit, a first symmetric transmission control unit, and a first extending apparatus connection interface.

The first processing unit is for converting the format of the data packages between a first communication protocol and a second communication protocol. In which the second communication protocol can be VDSL, VDSL2, or G.SHDSL. The first transmission rate regulation unit couples with the first processing unit, for setting a first data transmission rate of the first network extending apparatus. The first symmetric transmission control unit couples with the first processing unit, for keeping two directions transmission rate symmetric according to the first data transmission rate and the second communication protocol. And, the first extending apparatus connection interface is couples with the symmetric transmission control unit, for connecting with the second network extending apparatus.

Furthermore, the second network extending apparatus is coupled with the first network extending apparatus and the electrical device. The second network extending apparatus has a second processing unit, a second transmission rate regulation unit, a second symmetric transmission control unit, and a second extending apparatus connection interface.

Wherein the second processing unit is for converting data formats between the first communication protocol and the second communication protocol. The second transmission rate regulation unit couples with the second processing unit, for setting a second data transmission rate of the second network extending apparatus. The second symmetric transmission control unit couples with the second processing unit, for controlling the two ways transmission rate symmetric according to the second communication protocol and the second data transmission rate. And, the second extending apparatus connection interface couples with the second symmetric transmission control unit, in which the second extending apparatus connection interface connects to the first network extending apparatus through a transmission line which can be a coaxial cable or a copper wire.

The second signal and power integration unit couples with the second processing unit, for integrating electrical power along with the transmitted signals. In which the second signal and power integration unit can be a PoE unit. The second power supply unit couples with the second signal and power integration unit, for providing electrical power to the signal and power integration unit. And, the second signal and power connection interface couples with the second signal and power integration unit, for connecting the electrical device and for transmitting electrical power and signals.

Additionally, the first data transmission rate and the second data transmission rate are substantially the same value. Therefore, the data receiving and sending rate between the first and second network extending apparatus are symmetric.

According to the present invention, a network extending method is disclosed. The method is for extending the network connection distance between a host and an electrical device. Specifically, the data received and transmitted by the host and the electrical device is in the format of a first communication protocol. The method includes: setting up a network extending system between the host and the electrical device. In which the system has a first network extending apparatus connecting with the host, and a second network extending apparatus connecting with the electrical device.

After that, the data format are converted between the first communication protocol and a second communication protocol by the first network extending apparatus and the second network extending apparatus. Thus, the data which is transmitted between the first and second network extending apparatus can be transmitted in the format of the second communication protocol. Then a transmission line is installed between the first and second network extending apparatus according to the second communication protocol. Specifically, the length of the transmission line which can be used in the second communication protocol is longer than the length of the transmission line which can be used in the first communication protocol.

Then, the data transmission rate of the first and second network extending apparatus is determined. The steps of determining the first and second data transmission rate include: choosing one of the first and second transmission rate regulation unit as a local transmission rate regulation unit, the other as a remote transmission rate regulation unit. In which the local transmission rate regulation unit is for determining a local data transmission rate, and the remote transmission rate regulation unit is for determining a remote data transmission rate.

After that, the local transmission rate regulation unit transmits an initial signal to the remote transmission rate regulation unit. Then the remote transmission rate regulation unit measures a signal characteristic of the received initial signal, and send the signal characteristic back to the local transmission rate regulation unit. Lastly, the local and remote data transmission rate are determined according to the signal characteristic.

As described above, the present invention discloses system, apparatus, and method for extending network with power supply. In which, according to the present invention, the difficulties and cost of installing outdoor electrical devices can be reduced.

For further understanding of the invention, reference is made to the following detailed description illustrating the embodiments and examples of the invention. The description is only for illustrating the invention, not for limiting the scope of the claim.

BRIEF DESCRIPTION OF THE DRAWINGS

The drawings included herein provide further understanding of the invention. A brief introduction of the drawings is as follows.

DETAILED DESCRIPTION OF THE PREFERRED EMBODIMENTS

Figure 1:
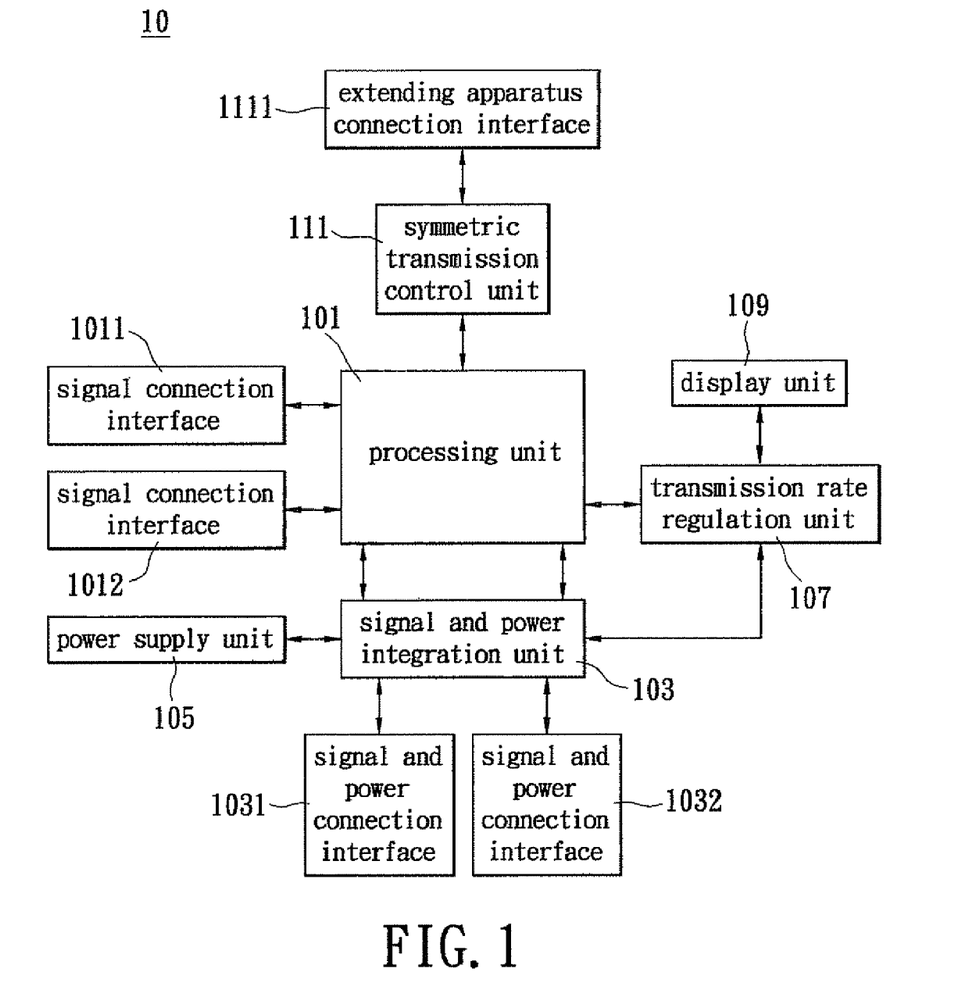
FIG. 1 is a block diagram of an embodiment of network extending apparatus with power supply according to the present invention.

Please refer to FIG. 2, which is a block diagram of an embodiment of network extending apparatus 10 with power supply. The network extending apparatus 10 includes a processing unit 101, a signal and power integration unit 103, a power supply unit 105, a transmission rate regulation unit 107, a display unit 109, a symmetric transmission control unit 111, signal connection interface 1011 and 1012, signal and power connection interface 1031 and 1032, and an extending apparatus connection interface 1111.

The processing unit 101 is for converting data formats of the transmitted data packages between a first communication protocol and a second communication protocol, and for assigning the address of the data packages in order to send the packages to the right destination. In which, the first communication protocol can be the communication protocol of Ethernet, and the second communication protocol can be a symmetric communication protocol such as VDSL, VDSL2, and G.SHDSL, etc.

When the processing unit 101 receives a data package in Ethernet format from an electrical device (not shown), the processing unit 101 converts the received data package into VDSL, VDSL2, or G.SHDSL format, and then sends the data package to another network extending apparatus through the extending apparatus connection interface 1111. On the other hand, if a data package is sent to the processing unit 101 through the extending apparatus connection interface 1111, the processing unit 101 then converts the format of the data package from second communication protocol to Ethernet protocol, and transmits the corresponding electrical device according to the destination address of the data package.

The signal and power integration unit 103 couples with the processing unit 101, for integrating data signals and electrical power which is transmitted from the power supply unit 105. In which the signal and power integration unit 103 is a PoE (Power over Ethernet) unit which can let electrical power be transmitted alone with the data signal. The electrical power and the data signals are transmitted to electrical devices through the signal and power connection interface 1031 and 1032 (such as a RJ45 port or so called 8P8C port). Therefore, the electrical devices can receive electrical power through the network connection, and does not need additional power transmission line to obtain requisite electrical power.

The transmission rate regulation unit 107 couples with the processing unit 101, for determining the data transmission rate of the network extending apparatus 10. And, the display unit 109 couples with the transmission rate regulation unit 107, for displaying the value of the data transmission rate, so that users can assign proper network bandwidth to each electrical device. In which, the display unit 109 can be a LED or a LCD display, etc.

Additionally, the symmetric transmission control unit 111 couples with the processing unit 101, for controlling the transmission rate between the network extending apparatus 10 and another network extending apparatus, according to the second communication protocol and data transmission rate determined by the transmission rate regulation unit 107.

Figure 2:
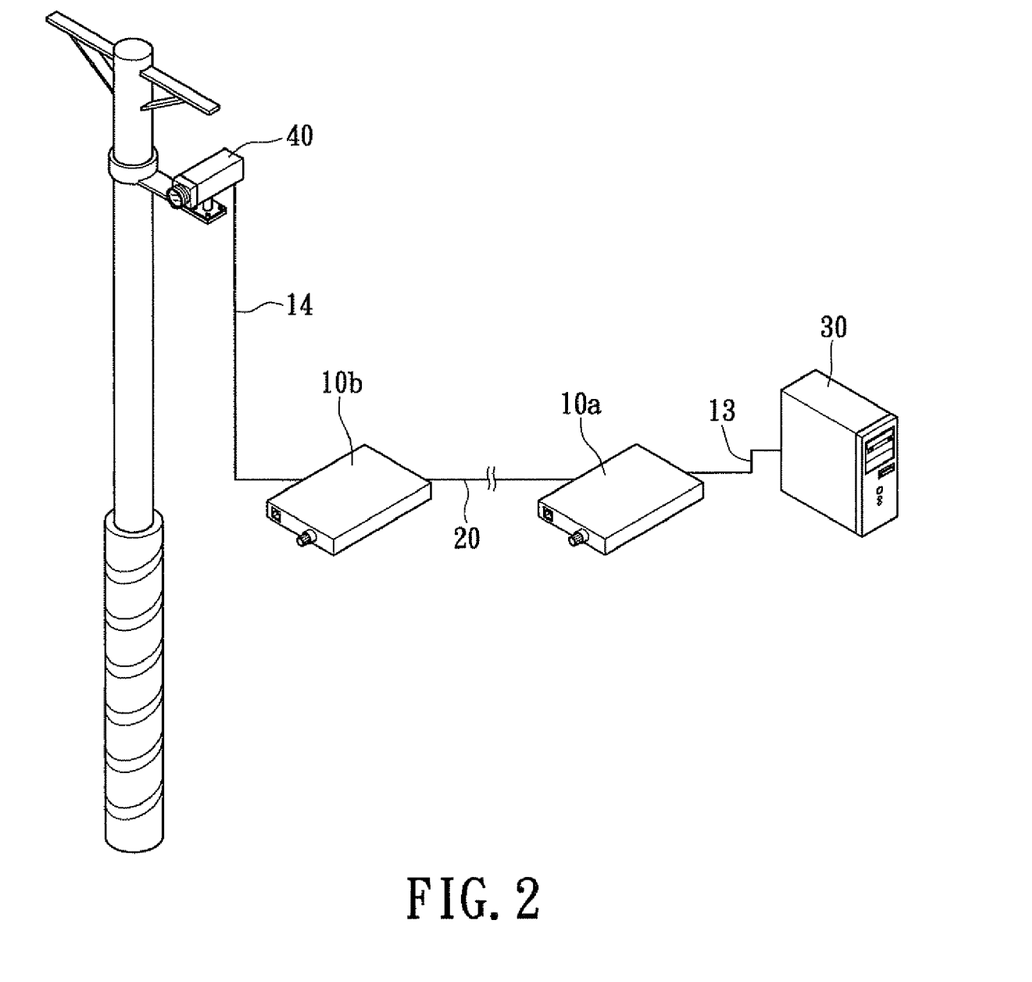
FIG. 2 is a schematic diagram of an embodiment of network extending system with power supply according to the present invention.

Please refer to FIG. 2, which is a schematic diagram of an embodiment of network extending system with power supply. The system includes a first network extending apparatus 10*a* and a second network extending apparatus 10*b*. The system connects between a host 30 and an electrical device 40, for extending the distance of network connection. Generally, the Ethernet uses CAT3, CAT5, or CAT6 coaxial cables (such as the transmission line 13 and 14 shown in FIG. 2) to connect devices, the limit of connection distance is about 100 meters long.

Briefly speaking, the data packages which are transmitted between the host 30 and the electrical device 40 are generally in Ethernet format, and if the network connection distance of the Ethernet is not long enough for some long-distance transmission, the communication protocol for transmission data should be changed. That is, there needs an apparatus for converting the format of data package which is sent out from the data output end (such as electrical device 40) into the second communication protocol (such as VDSL, VDSL2 or G.SHDSL communication protocol). And, before the data package is receives by the data receiving end (such as host 30), there also needs another apparatus for converting the data format back to Ethernet format. In which, the second communication protocol has longer network connection distance than Ethernet communication protocol. Thus, the network connection distance can be extended.

The first network extending apparatus 10*a* and the second network extending apparatus 10*b* are used in pair. The transmission line 20 is used between the first network extending apparatus 10*a* and the second network extending apparatus 10*b*, in order to extend the network connection distance. The data packages transmitted between the first network extending apparatus 10*a* and the second network extending apparatus 10*b* can be in the VDSL, VDSL2, or G.SHDSL communication format. And, the transmission line can be a coaxial cable or a copper wire, which can be used in VDSL, VDSL, and G.SHDSL communication protocols. In which, the coaxial cable can extend the network connection distance to more than 2600 meters, and the copper wire can extend the network connection distance to more than 1900 meters. Certainly, the interfaces used to connect the first network extending apparatus 10*a* and the second network extending apparatus 10*b* are chosen according to the type of the transmission line 20. For example, if the transmission line 20 is coaxial cable, the interface is BNC connection port; and if the transmission line 20 is copper wire, the interface is RJ11 connection port.

Figure 3:
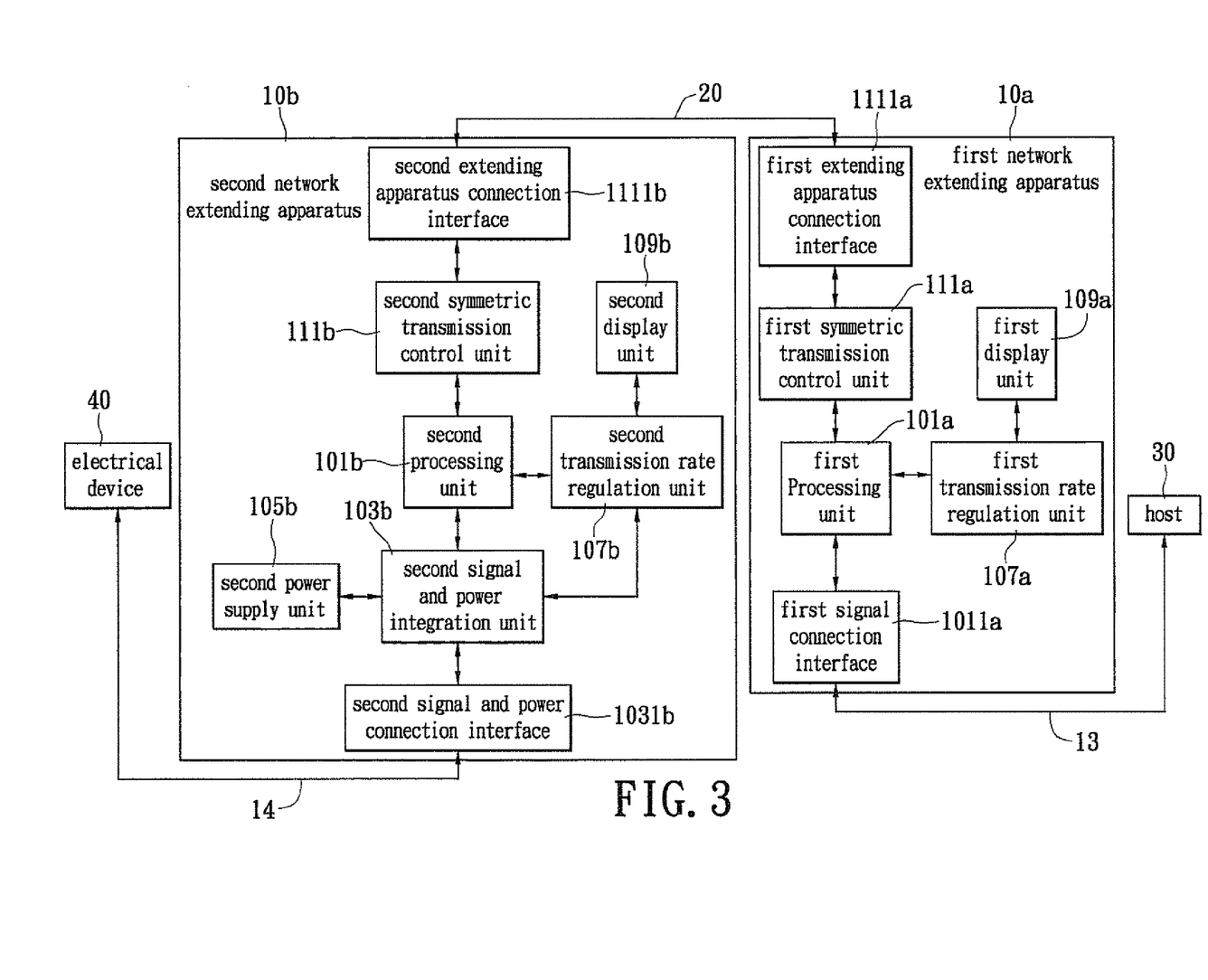
FIG. 3 is a block diagram of an embodiment of network extending system with power supply according to the present invention.

Please refer to FIG. 3, which is a block diagram of an embodiment of network extending system with power supply. The system includes the first network extending apparatus 10*a* and the second network extending apparatus 10*b*. In which, the first network extending apparatus 10*a* connects with host 30 using a transmission line 13, and the second network extending apparatus 10*b* connects with the electrical device 40 using a transmission line 14.

In which, the first network extending apparatus 10*a* has a first processing unit 101*a*, a first transmission rate regulation unit 107*a*, a first display unit 109*a*, a first symmetric transmission control unit 111*a*, a first signal connection interface 1011*a*, and a first extending apparatus connection interface 1111*a*. In the present invention, the host 30 which connects to the first network extending apparatus 10*a* has its own power source, so the first network extending apparatus 10*a* does not need to integrate electrical power alone with data signals. Thus, the first signal connection interface 1011*a* is a normal connector and does not transmit electrical power. And, the first signal connection interface 1011*a* can be a RJ45 port (so called 8P8C port), and connects to the host 30 through transmission line 13. Of course, the first network extending apparatus 10*a* can also transmit electrical power alone with signals to the host 30, so the host 30 can obtain electrical power from first network extending apparatus 10*a* through transmission line 13.

The second network extending apparatus 10*b* has a second processing unit 101*b*, a second signal and power integration unit 103*b*, a second power supply unit 105*b*, a second transmission rate regulation unit 107*b*, a second display unit 109*b*, a second symmetric transmission control unit 111*b*, a second signal and power connection interface 1031*b*, and a second extending apparatus connection interface 1111*b*.

After the connection between the first network extending apparatus 10*a* and the second network extending apparatus 10*b* has installed, the first transmission rate regulation unit 107*a* and second transmission rate regulation unit 107*b* determine and regulate the value of two-directional data transmission rate. The data transmission rate between the first network extending apparatus 10*a* and the second network extending apparatus 10*b* is symmetric. Specifically, the transmission rate will be determined according to the status of the current connection, such as the real connection distance or amounts of data to be transmitted, in order to make the connection work in the most efficient condition.

And after the data transmission rate is determined, the first display unit 109*a* and the second display unit 109*b* will then display the value of the data transmission rate. The display unit 109*a* and 109*b* can be LEDs which tell the users the value of transmission rate, so the users can properly assign the bandwidth to each electrical device 40. For instance, we suppose that the transmission rate is 25 Mbps to 30 Mbps, each outdoor monitor needs 10 Mbps for transmitting data, and each camera needs 5 Mbps for transmitting data. So, the user can connect at least two outdoor monitors and one camera, or at least one outdoor monitor and three cameras.

Please refer to FIG. 3 again, in this embodiment, the host 30 uses Ethernet communication protocol to transmit data packages, and the transmission line 13 is the transmission line which can be used in Ethernet communication protocol. When the first network extending apparatus 10*a* receives a data package from the host 30 through the first signal connection interface 1011*a*, the first processing unit 101*a* then converts the data package from Ethernet format to VDSL, VDSL2, or G.SHDSL format, and sends the data package to the first symmetric transmission control unit 111*a*. The first symmetric transmission control unit 111*a* is for keeping the data transmission rate between the first network extending apparatus 10*a* and the second network extending apparatus 10*b* according to the VDSL, VDSL2, or G.SHDSL protocol, and for sending the data package to the second network extending apparatus 10*b* through the first extending apparatus connection interface 1111*a*.

After the second network extending apparatus 10*b* receives the data package which is transmitted from the first network extending apparatus 10*a* through the second extending apparatus connection interface 1111*b*, the second processing unit 101*b* then converts the data package back to Ethernet format and sends the data package to the second signal and power integration unit 103*b*. After that, the second signal and power integration unit 103*b* combines the data package with the electrical power which is transmitted from the second power supply unit 105*b* according to the techniques of PoE. And the combined electrical power and data package are then transmitted to the electrical device 40 through the transmission line 14. Thus, the electrical device 40 does not need any extra power supply or power transmission lines in order to obtain requisite electrical power.

In the opposite data transmission cases (the data packages are transmitted from the electrical device 40 to the host 30), the data package transmission process is similar to the process described above. The differences are that the data package which is transmitted from the electrical device 40 to the host 30 does not integrate with electrical power, because the host 30 has its own power source and does not need to obtain electrical power from the first network extending apparatus 10*a*. Of course, the host 30 can also choose to get electrical power from the first network extending apparatus 10*a*, and the data package which is transmitted to the host 30 will be combined with electrical power similarly by the techniques of PoE.

That is, by installing the network extending system between the host 30 and the electrical device 40, the data packages which are transmitted between the first network extending apparatus 10*a* and the second network extending apparatus 10*b* can be transmitted in the format of the second communication protocol. In which, the second communication protocol can transmit data package in longer distance than the Ethernet communication protocol. Therefore, the network connection distance between the host 30 and the electrical device 40 can be greatly extended.

Figure 4:
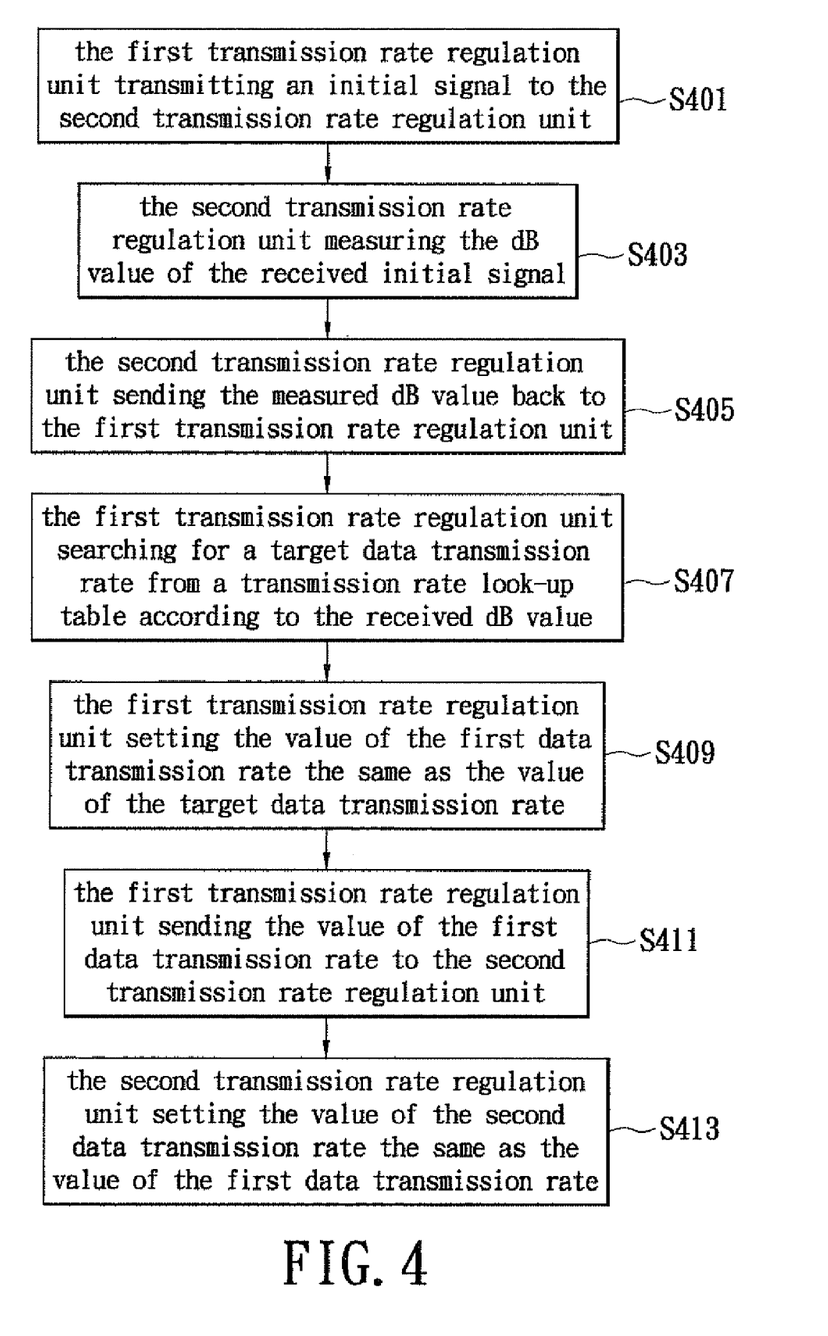
FIG. 4 is a flow chart of an embodiment of determining the data transmission rate of the network extending apparatus according to the present invention.

Please refer to FIG. 4, which is a flow chart of an embodiment of data transmission rate determination process of the network extending apparatus 10*a* and 10*b*. Firstly, one of the network extending apparatus 10*a* and 10*b* is set as a local network extending apparatus, and the other is set as a remote network extending apparatus. In this embodiment, the first network extending apparatus 10*a* is set as the local network extending apparatus, and the second network extending apparatus 10*b* is set as the remote network extending apparatus. And, the first transmission rate regulation unit 107*a* is set as a local transmission rate regulation unit, and the second transmission rate regulation unit 107*b* is set as a remote transmission rate regulation unit. Of course, the first network extending apparatus 10*a* can be set as remote end, and the second network extending apparatus 10*b* can be set as local end, depending on the user's requirements.

When the connection between the first network extending apparatus 10*a* and the second network extending apparatus 10*b* is established, the one which is chosen as local end (the first network extending apparatus 10*a* in this embodiment) then sends an initial signal which is in certain magnitude of energy (dB value) to the remote network extending apparatus by its local transmission rate regulation unit (the first transmission rate regulation unit 103*a* in this embodiment) (S401). And during the transmission, the energy magnitude of the initial signal is lowered because of the resistance of the transmission line 20, and the energy reduced is depending on the length of the transmission line 20.

After the second transmission rate regulation unit 103*b* of the second network extending apparatus 10*b* receives the initial signal, the second network extending apparatus 10*b* then measures a signal characteristic (dB value in this embodiment) of the initial signal (S403), and transmits the signal characteristic back to the first network extending apparatus 10*a* (S405). And then, the first network extending apparatus 10*a* then search for a target data transmission rate from a transmission rate look-up table (S407). After that, the first transmission rate regulation unit 107*a* determines the value of the local data transmission rate the same as the value of the target data transmission rate (S409).

In which, the transmission rate look-up table is stored in the first transmission rate regulation unit 107*a* and the second transmission rate regulation unit 107*b*. The transmission rate look-up table records that the maximum data transmission rate can be used according to the remained dB value of the initial signal which is received by the second network extending apparatus 10*b*. By checking the transmission rate look-up table, the first transmission rate regulation unit 107*a* can determine the most efficient value of the local data transmission rate.

After the first transmission rate regulation unit 107*a* determines the value of the local data transmission rate, the value of the local data transmission rate is then sent to the second network extending apparatus 10*b* (S411). So that the second transmission rate regulation unit 107*b* can determine the value of the remote data transmission rate the same as the value of the local data transmission rate (S413). Thus, the data transmission rates are all be determined.

Figure 5:
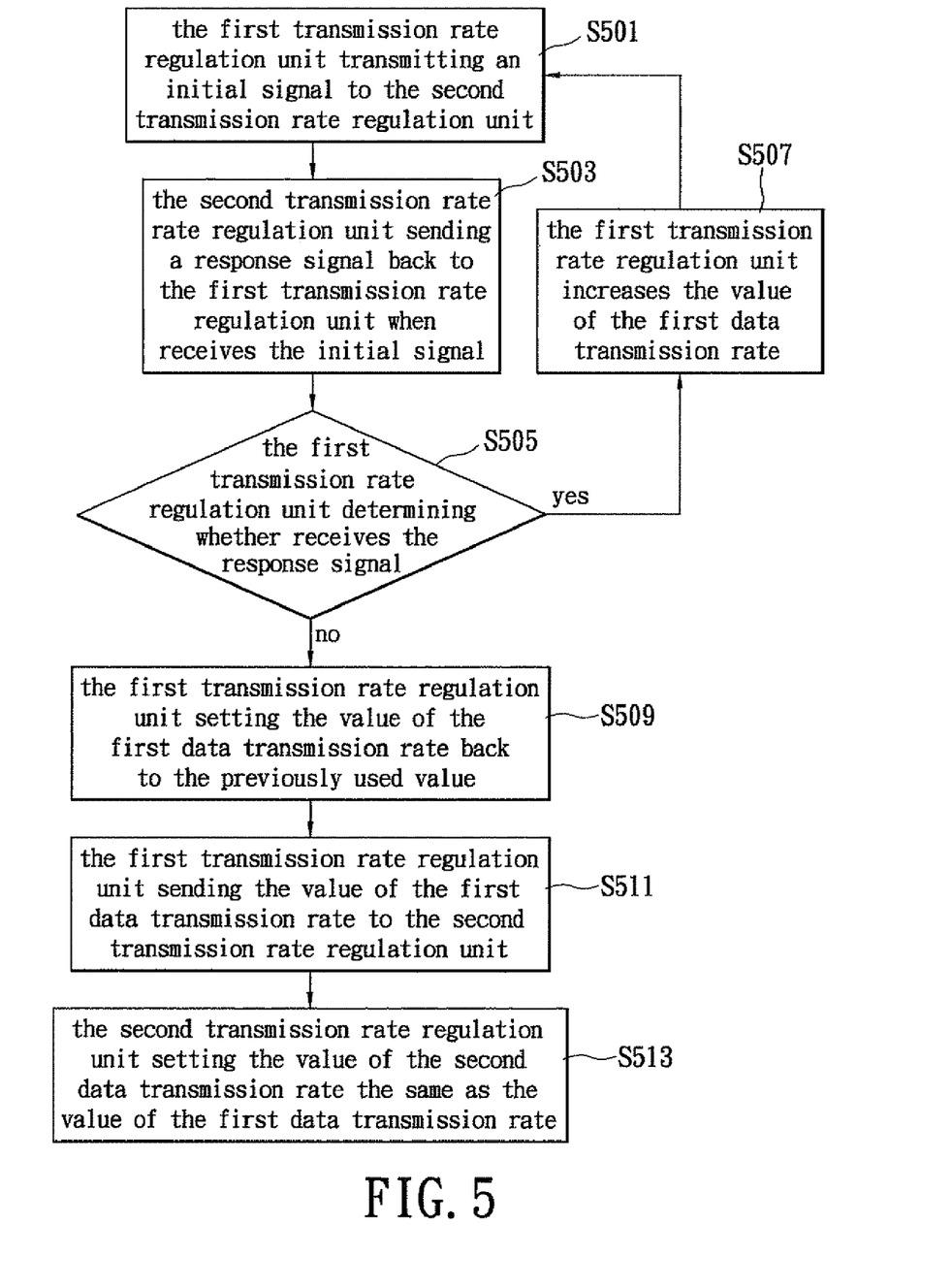
FIG. 5 is a flow chart of another embodiment of determining the data transmission rate of the network extending apparatus according to the present invention.

Please refer to FIG. 5, which is another embodiment of data transmission rate determination process between the first network extending apparatus 10*a* and the second network extending apparatus 10*b*. Similarly, the first network extending apparatus 10*a* is set as local network extending apparatus, and the second network extending apparatus 10*b* is set as the remote network extending apparatus.

Firstly, when the connection between the first network extending apparatus 10*a* and the second network extending apparatus 10*b* is installed, the first (local) transmission rate regulation unit 107*a* sends an initial signal to the second (remote) network extending apparatus 10*b* (S501). And when the second transmission rate regulation unit 107*b* of the second network extending apparatus 10*b* receives the initial signal, it then sends a signal characteristic (a response signal in this embodiment) back to the first transmission rate regulation unit 107*a* (S503).

The first transmission rate regulation unit 107*a* starts to determine whether receives the response signal in a certain period of time right after the initial signal was sent (S505). If the determination result is yes, it means that the current data transmission rate of the first network extending apparatus is usable and does not reach the limit yet. In this case, the first transmission rate regulation unit 107*a* then increases the value of the currently using data transmission rate (S507), and sends the initial signal to the second network extending apparatus 10*b* again (S501).

The determining and sending processes are repeatedly executed until the determination result shows that the first transmission rate regulation unit 107*a* does not receive the response signal in a certain period of time. In this case, the reason of the response signal loss may be that the currently using data transmission rate is too fast. Therefore, the first transmission rate regulation unit 107*a* then sets the value of the data transmission rate of the network extending apparatus 10*a* back to the previously used value (the value which does not cause response signal loss) (S509). And then the value is sent to the second transmission rate regulation unit 107*b* (S511). At last, the second transmission rate regulation unit 107*b* then sets the second data transmission rate the same as the received value (S513).

The differences of the data transmission rate determination process between FIG. 5 and FIG. 4 are that the process in FIG. 5 tests repeatedly, and increases the used data transmission rate gradually in order to reach the transmission rate limit according to the real condition of the network connection. And the process in FIG. 4 directly searches for a certain value form the transmission rate look-up table in order to determine the value of the data transmission rate.

Additionally, after the data transmission rates of the first network extending apparatus 10*a* and second network extending apparatus 10*b* are determined, the first display unit 109*a* and the second display unit 109*b* will display the value of the determined data transmission rates. Therefore, the user can know how many the data transmission rate is and can assign the transmission bandwidth to each electrical device 40.

As described above, the present invention extends the network connection distance by transmitting the data packages in second communication protocol format. And the electrical power can be transmitted alone with the data packages through normal data transmission line by combining the electrical power with signals. Thus, according to the present invention, the outdoor electrical devices do not need to install extra power transmission line or independent power supply, further decreasing the cost, the difficulties of maintaining, and complicity of establishing the electrical devices.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. A network extending apparatus with power supply, connecting with another network extending apparatus, in which the network extending apparatus and the another network extending apparatus are respectively set as a local network extending apparatus and a remote network extending apparatus, the network extending apparatus comprises:
   a processing unit for converting a format of data packages between a first communication protocol and a second communication protocol, in which the second communication protocol is a symmetric communication protocol;
   at least one signal and power integration unit coupling with the processing unit, in which the at least one signal and power integration unit is for integrating electrical power and signals, so that electrical power and signals are transmitted together;
   a power supply unit coupling with the at least one signal and power integration unit, in which the power supply unit is for providing electrical power to the at least one signal and power integration unit;
   at least one signal and power connection interface coupling with the at least one signal and power integration unit, in which the at least one signal and power connection interface is for connecting to an electrical device, and for transmitting electrical power and signals;
   a symmetric transmission control unit coupling with the processing unit, in which the symmetric transmission control unit is for keeping transmission rates in both directions symmetric, according to the second communication protocol; and
   a transmission rate regulation unit coupling with the processing unit, being chosen as a local transmission rate regulation unit when the network extending apparatus being set as the local network extending apparatus, or being chosen as a remote transmission rate regulation unit when the network extending apparatus being set as the remote network extending apparatus;
   wherein the local transmission rate regulation unit transmits an initial signal to the remote transmission rate regulation unit, the remote transmission rate regulation unit measures a signal characteristic of the initial signal and sends the signal characteristic to the local transmission rate regulation unit, so that the local transmission rate regulation unit determines a value of a local data transmission rate according to the signal characteristic, and the remote transmission rate regulation unit determines a value of a remote data transmission rate according to the signal characteristic.

2. The network extending apparatus as in claim 1, wherein the first communication protocol is an Ethernet communication protocol, and the second communication protocol is a VDSL (Very-high-bitrate Digital Subscriber Line) communication protocol, a VDSL2 (Very-high-bitrate Digital Subscriber Line 2) communication protocol, or a G. SHDSL (Single-pair High-speed Digital Subscriber Line) communication protocol.

3. The network extending apparatus as in claim 1, wherein the at least one signal and power integration unit is a PoE (Power over Ethernet) unit.

4. The network extending apparatus as in claim 1, further comprising:
   an extending apparatus connection interface coupling with the symmetric transmission control unit, in which the extending apparatus connection interface is for connecting another network extending apparatus through a transmission line.

5. The network extending apparatus as in claim 1, further comprising:
   a display unit coupling with the transmission rate regulation unit, in which the display unit is for displaying the value of the local data transmission rate when the network extending apparatus being set as the local network extending apparatus, or for displaying the value of the remote data transmission rate when the network extending apparatus being set as the remote network extending apparatus.

6. A network extending system with a power supply, in which the network extending system couples between a host and an electrical device, comprising:
   a first network extending apparatus coupling with the host through a host connection interface, the first network extending apparatus comprising:
      a first processing unit for converting a format of data packages between a first communication protocol and a second communication protocol, in which the second communication protocol is a symmetric communication protocol;
      a first transmission rate regulation unit coupling with the first processing unit, in which the first transmission rate regulation unit is for determining a value of a first data transmission rate of the first network extending apparatus;
      a first symmetric transmission control unit coupling with the first processing unit, in which the first symmetric transmission control unit is for keeping transmission rates of the first network extending apparatus in both directions symmetric, according to the second communication protocol and the first data transmission rate;
      and a first extending apparatus connection interface coupling with the first symmetric transmission control unit;

a second network extending apparatus coupling with the electrical device and the first network extending apparatus, the second network extending apparatus comprising:
- a second processing unit for converting a format of data packages between the first communication protocol and the second communication protocol, in which the second communication protocol is the symmetric communication protocol;
- a second transmission rate regulation unit coupling with the second processing unit, in which the second transmission rate regulation unit is for determining a value of a second data transmission rate of the second network extending apparatus;
- a second symmetric transmission control unit coupling with the second processing unit, in which the second, symmetric transmission control unit is for keeping transmission rates of the second network extending apparatus in both directions symmetric, according to the second communication protocol and the second data transmission rate;
- a second extending apparatus connection interface coupling with the second symmetric transmission control unit, in which the second extending apparatus connection interface is for connecting to the first extending apparatus connection interface through a transmission line;
- at least one second signal and power integration unit coupling with the second processing unit, in which the at least one second signal and power integration unit is for integrating electrical power and signals, so that electrical power and signals are transmitted together;
- a second power supply unit coupling with the at least one second signal and power integration unit, in which the second power supply unit is for providing electrical power to the at least one second signal and power integration unit;
- and at least one second signal and power connection interface coupling with the at least one second signal and power integration unit, in which the at least one second signal and power connection interface is for connecting to the electrical device, and for transmitting signals and electrical power;

whereby the first data transmission rate and the second data transmission rate have the same value, wherein a local transmission rate regulation unit is chosen between the first transmission rate regulation unit of the first network extending apparatus and the second transmission rate regulation unit of the second network extending apparatus, and the other one is chosen as a remote transmission rate regulation unit, wherein the local transmission rate regulation unit is for determining a value of a local data transmission rate, the remote transmission rate regulation unit is for determining a value of a remote data transmission rate, the local transmission rate regulation unit transmits an initial signal to the remote transmission rate regulation unit, the remote transmission rate regulation unit measures a signal characteristic of the initial signal and sends the signal characteristic to the local transmission rate regulation unit, so that the local transmission rate regulation unit determines a value of the local data transmission rate according to the signal characteristic, and the remote transmission rate regulation unit determines a value of the remote data transmission rate according to the signal characteristic.

7. The network extending system as in claim 6, wherein the first communication protocol is an Ethernet communication protocol, and the second communication protocol is a VDSL (Very-high-bitrate Digital Subscriber Line) communication protocol, a VDSL2 (Very-high-bitrate Digital Subscriber Line 2) communication protocol, or a G. SHDSL (Single-pair High-speed Digital Subscriber Line) communication protocol.

8. The network extending system as in claim 6, wherein the at least one second signal and power integration unit is a PoE (Power over Ethernet) unit.

9. The network extending system as in claim 6, the transmission line is a coaxial cable or a copper wire.

10. The network extending system as in claim 6, wherein the first network extending apparatus has a first display unit for displaying the value of the first data transmission rate; and the second network extending apparatus has a second display unit for displaying the value of the second data transmission rate.

11. A network extending method, for extending network connection length between a host and an electrical device, in which sets of data sent from and received by the host and the electrical device are in a format of a first communication protocol, the method comprising:
- setting up a network extending system between the host and the electrical device, in which the network extending system has a first network extending apparatus coupling with the host, and a second network extending apparatus coupling with the electrical device;
- converting a format of data between the first communication protocol and a second communication protocol by the first network extending apparatus and the second network extending apparatus, so that data is transmitted between the first network extending apparatus and the second network extending apparatus in a format of the second communication protocol;
- connecting the first network extending apparatus and the second network extending apparatus by a transmission line according to the second communication protocol, in which a length of the transmission line which is used according to the second communication protocol is longer than a length of the transmission line which is used according to the first communication protocol;
- and determining values of transmission rates of the first network extending apparatus and the second network extending apparatus according to the second communication protocol, wherein the step of determining values of transmission rates includes:
  - choosing a local transmission rate regulation unit between a first transmission rate regulation unit of the first network extending apparatus and a second transmission rate regulation unit of the second network extending apparatus, choosing the other one as a remote transmission rate regulation unit, in which the local transmission rate regulation unit is for determining a value of a local data transmission rate, and the remote transmission rate regulation unit is for determining a value of a remote data transmission rate;
  - the local transmission rate regulation unit transmitting an initial signal to the remote transmission rate regulation unit;
  - the remote transmission rate regulation unit measuring a signal characteristic of the initial signal, and sending the signal characteristic to the local transmission rate regulation unit;
  - and determining values of the local data transmission rate and the remote data transmission rate according to the signal characteristic.

12. The network extending method as in claim 11, wherein the first communication protocol is an Ethernet communication protocol, and the second communication protocol is a VDSL (Very-high-bitrate Digital Subscriber Line) communication protocol, a VDSL2 (Very-high-bitrate Digital Subscriber Line 2) communication protocol, or a G. SHDSL (Single-pair High-speed Digital Subscriber Line) communication protocol.

13. The network extending method as in claim 11, wherein the signal characteristic is an energy magnitude of the initial signal.

14. The network extending method as in claim 13, wherein the step of determining values of the local data transmission rate and the remote data transmission rate includes:
   the local transmission rate regulation unit searching for a target transmission rate from a transmission rate look-up table, and making the value of the local data transmission rate the same as a value of the target transmission rate;
   the local transmission rate regulation unit sending the value of the target transmission rate to the remote transmission rate regulation unit; and
   the remote transmission rate regulation unit making the value of the remote data transmission rate the same as the value of the target transmission rate.

15. The network extending method as in claim 11, wherein the signal characteristic is a response signal generated when the remote transmission rate regulation unit receives the initial signal.

16. The network extending method as in claim 15, wherein the step of determining values of the local data transmission rate and the remote data transmission rate includes:
   the local transmission rate regulation unit determining whether or not the local transmission regular unit receives the response signal;
   the local transmission rate regulation unit determining the value of the local data transmission rate according to the determination result; and
   the remote transmission rate regulation unit making the value of the remote data transmission rate the same as the value of the local data transmission rate.

17. The network extending method as in claim 16, wherein if the local transmission rate regulation unit receives the response signal, the local transmission rate regulation unit increases a value of a current transmission rate, and sends the initial signal to the remote transmission rate regulation unit again; repeat the step of the local transmission rate regulation unit determining whether or not the local transmission rate regulation receives the response signal.

18. The network extending method as in claim 16, wherein if the local transmission rate regulation unit does not receive the response signal, the value of the local data transmission rate is determined to be the same as a value of a transmission rate, which was used to send the initial signal to the remote transmission rate regulation unit previously.

\* \* \* \* \*